(No Model.)  4 Sheets—Sheet 1.

J. B. HAMILTON.
REED ORGAN.

No. 350,623.  Patented Oct. 12, 1886.

Witnesses.
J. N. Piper.
R. B. Torrey.

Inventor
James B. Hamilton
by R. H. Edd. atty.

(No Model.)
4 Sheets—Sheet 2.

J. B. HAMILTON.
REED ORGAN.

No. 350,623. Patented Oct. 12, 1886.

Witnesses:
S. N. Piper
H. B. Torrey

Inventor
James B. Hamilton
by R. H. Eddy atty (No Model.) 4 Sheets—Sheet 3.

J. B. HAMILTON.
REED ORGAN.

No. 350,623. Patented Oct. 12, 1886.

Witnesses.
S. N. Piper
R. B. Torrey

Inventor
James B. Hamilton
by R. H. Eddy atty.

(No Model.)	4 Sheets—Sheet 4.

J. B. HAMILTON.
REED ORGAN.

No. 350,623.   Patented Oct. 12, 1886.

Witnesses.
S. N. Piper
R. B. Torrey

Inventor.
James B. Hamilton.
by R. H. Eddy atty.

UNITED STATES PATENT OFFICE.

JAMES BAILLIE HAMILTON, OF WORCESTER, MASSACHUSETTS.

REED-ORGAN.

SPECIFICATION forming part of Letters Patent No. 350,623, dated October 12, 1886.

Application filed April 1, 1886. Serial No. 197,406. (No model.)

*To all whom it may concern:*

Be it known that I, JAMES BAILLIE HAMILTON, a subject of the Queen of Great Britain, but residing at present in the city of Worcester, in the county of Worcester, of the Commonwealth of Massachusetts, have invented a new and useful Improvement in Keyed Musical Instruments termed "Reed-Organs;" and I do hereby declare the same to be described in the following specification and represented in the accompanying drawings, of which—

Figure 1:
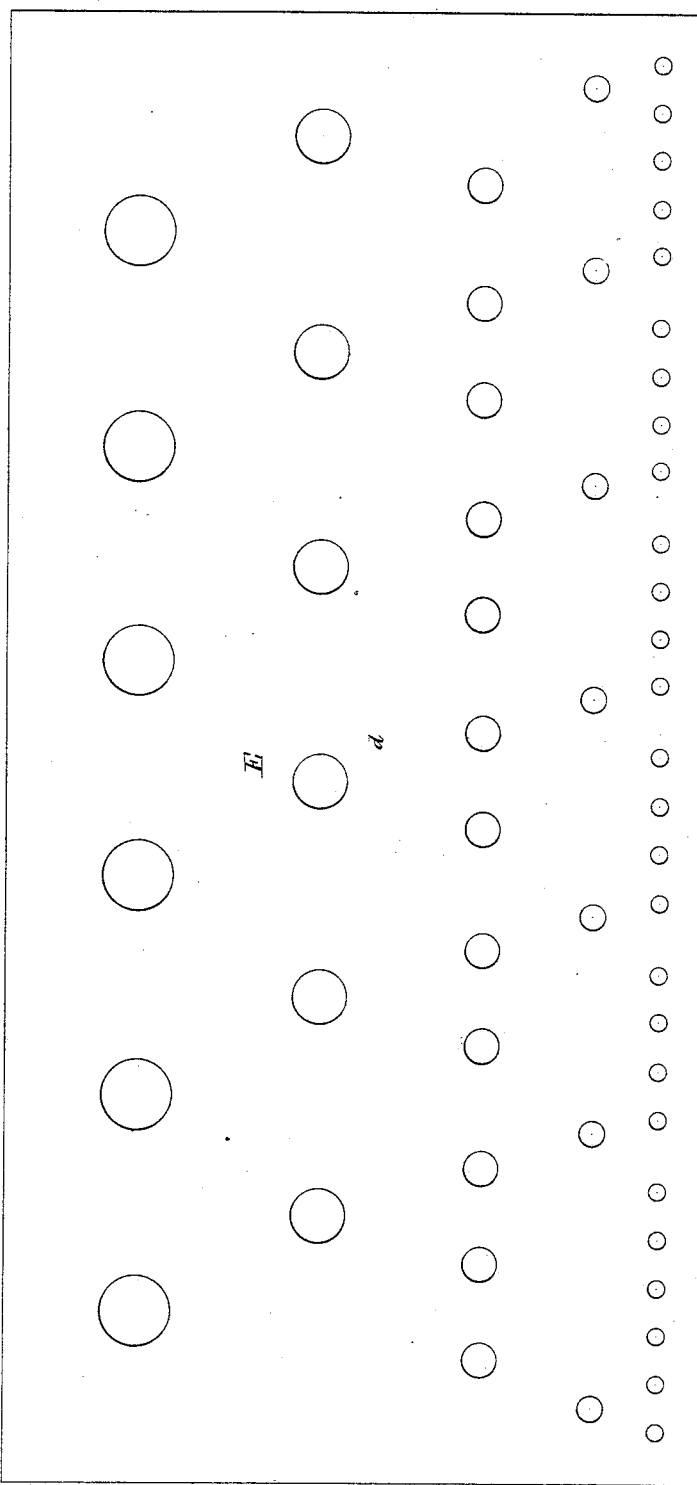
Figure 3:
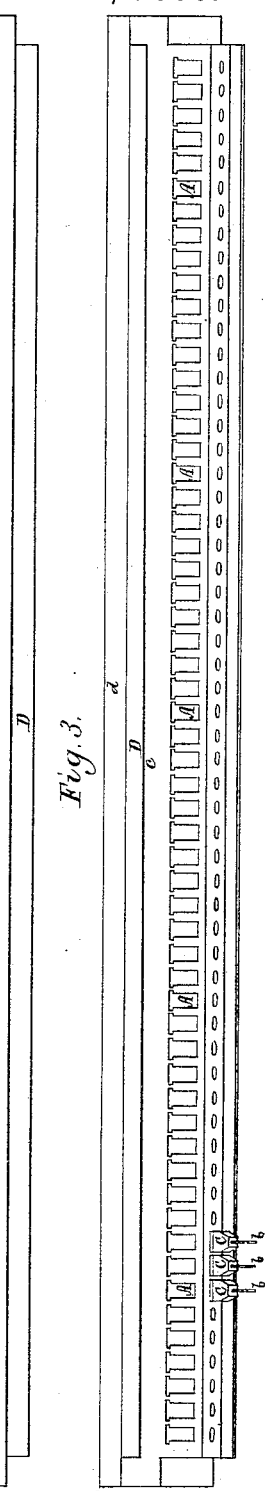
Figure 2:
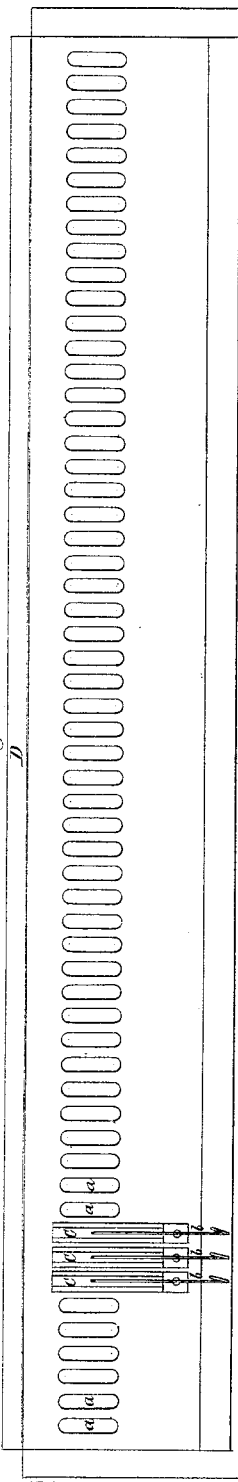
Figure 6:
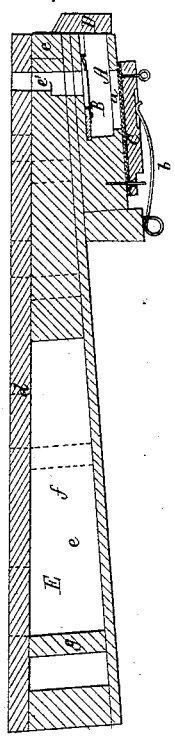
Figure 4:
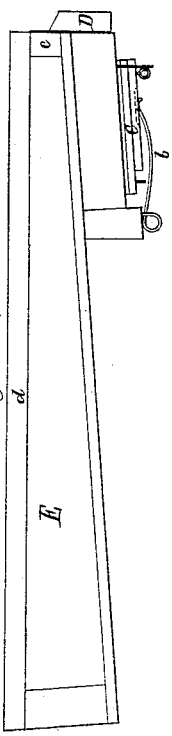
Figure 5:
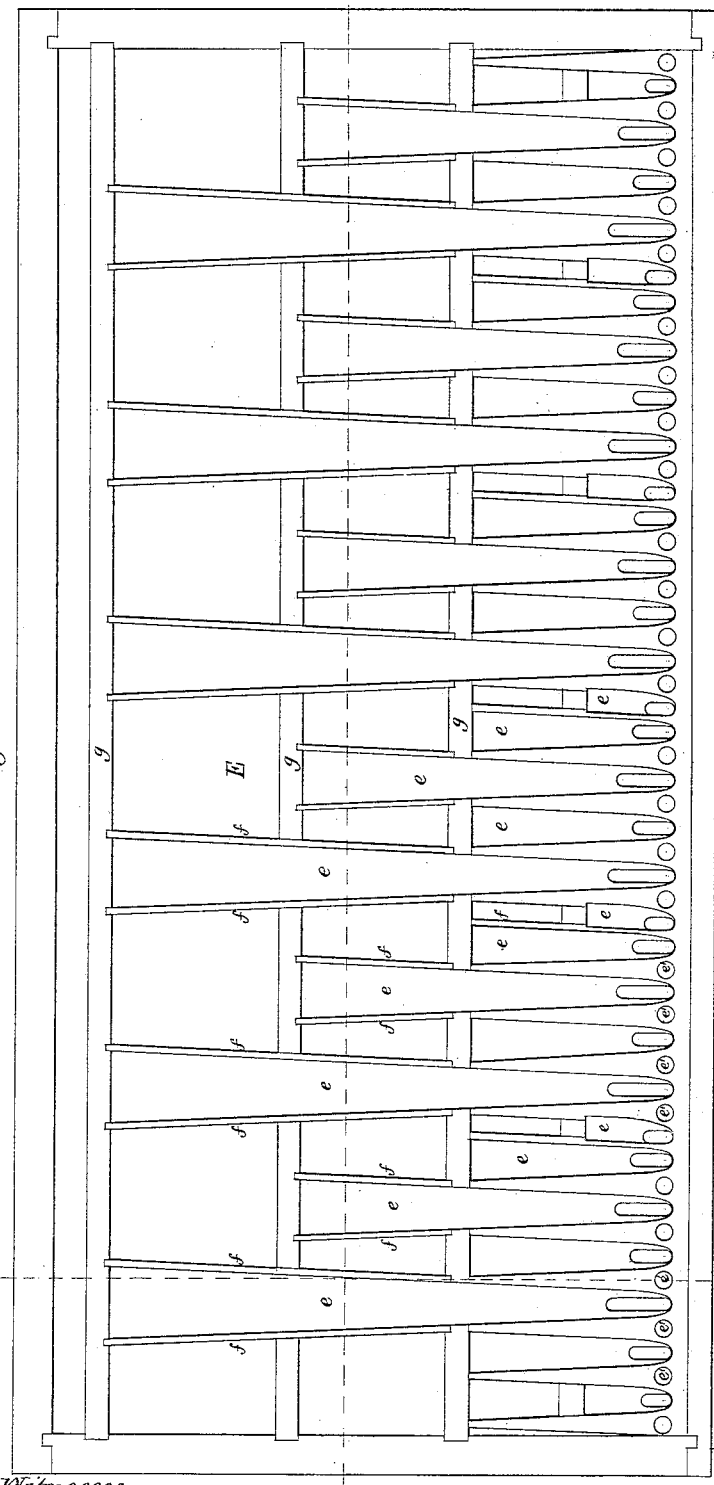
Figure 7:
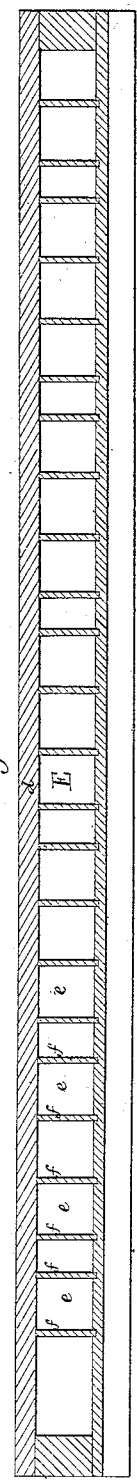

Figure 1 is a top view, Fig. 2 a bottom view, Fig. 3 a front elevation, Fig. 4 an end view, Fig. 5 a horizontal section, Fig. 6 a transverse section, and Fig. 7 a longitudinal cross-section, of an "organ sound-board" of my invention, the nature of which is defined in the claim hereinafter presented.

The said sound-board is for the use of pipes in conjunction with reeds, it being so constructed as to enable each pipe to stand on or in a base fully equal to its requirements as regards caliber or diameter, and to have the passage leading from each reed-tongue to the mouth of the pipe uncontracted or even expanded, all the reeds being in one range, with each of them easily accessible for being tuned or manipulated, as circumstances from time to time may require.

In the drawings, A A, &c., denote a series or range of reed-chambers arranged side by side, each of them being open at its front and closed at its rear end, and grooved in its upper part to receive a reed, B, which is slid horizontally into its chamber. There is an air-induct, $a$, through the bottom of each reed-chamber, there being applied to this induct a valve, C, provided with a spring, $b$, to force it upward. This valve, like others in reed-organs, is to be so connected with one of the keys of the series thereof as to be opened when such key is depressed by a performer.

To the mouths of the several reed-chambers there is a cover, D, that is hinged to the part $c$, directly over such chambers. Such cover is to enable access to the reeds and reed-chambers to be had, as may be necessary from time to time, especially for the withdrawal or introduction of any of the reeds.

The series of reed-chambers has over and extending in rear of them, as represented, a shallow chamber, E, which in its top $d$ has several ranges of holes, five of such ranges being represented, those of each range in advance of the rearmost one being represented as having a diameter greater than those of the next preceding range. Into each of these holes an organ-pipe is to be inserted and closely fitted, mouth downward. The holes of each set or series, except the first or foremost one, open upward out of separate channels $e$, formed within the chamber E, by partitions $f$ and $g$, arranged within it as represented. Each of such channels at its front opens into one of the reed-chambers. The first or foremost range of holes communicate with and are directly over vertical holes or passages $e'$, (see Figs. 5 and 6,) each of which opens into and extends upward from one of the reed-chambers and directly over its reed. The chamber E increases in depth from its front toward its rear part. The channels leading from certain of the reed-chambers to the outermost or fifth range of holes have between them all the channels of the other ranges. Furthermore, each channel of each range, with the exception of the passages $e'$, increases in width and height from its front to its rear end. The partitions $f$ extend in directions crosswise, while those marked $g$ run in directions lengthwise, of the chamber E, all being as shown in Fig. 5.

It will be seen from the drawings that whereas the reeds are drawn up in "line" or in range, the pipes which affect them will be drawn up in a "column" of successive ranks (five of which are here represented) by their receiving-holes. The rank most remote from the "reed-line" is to hold the pipes of greatest diameter to which the longest channels lead. These channels form the actual stems of the pipes. The next rank is to contain the next smaller pipes, and the next shorter channels are to lead to them, and so on through each rank until the reed-line is reached. The front rank is directly over the reed-line, so that the high notes, which demand short pipes, have immediate access to the outer air through the first rank, whereas the low notes, which demand long channels and long pipes, have their requirements fulfilled in the rear rank.

Figure 8:
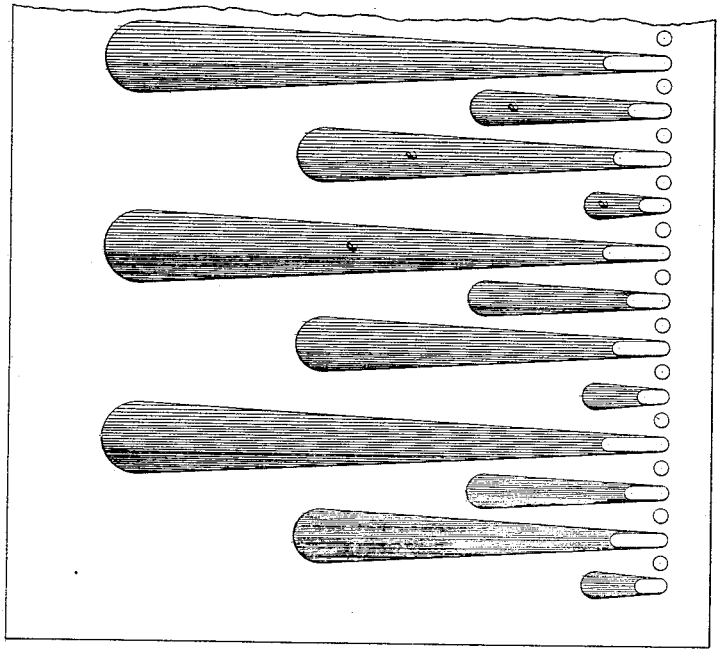

Fig. 8 is a representation of the manner in which the channels *e*, leading from the reed-chambers to the ranges of pipe-receiving holes, may be formed within a solid plank or block, to be capped by a cover of wood like the cover *d*, having such ranges made in it.

The above-described phalangal arrangement of the pipe-receiving holes relatively to the reeds and the intervening channels is one peculiarly advantageous.

I claim—

The combination of a range of reed-chambers open at their front ends and there provided with a closing valve or cover, as described, with a series of channels leading from such reed-chambers to several ranges of holes formed in a board over such channels and varying in size or diameter, substantially as and for the purpose as specified.

JAMES BAILLIE HAMILTON.

Witnesses:
R. H. EDDY,
R. B. TORREY.